(12) United States Patent
Yuan et al.

(10) Patent No.: US 11,272,119 B2
(45) Date of Patent: Mar. 8, 2022

(54) MULTI-SENSOR HIGH DYNAMIC RANGE IMAGING

(71) Applicant: Axis AB, Lund (SE)

(72) Inventors: Song Yuan, Lund (SE); Martin Santesson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/086,575

(22) Filed: Nov. 2, 2020

(65) Prior Publication Data

US 2021/0185215 A1 Jun. 17, 2021

(30) Foreign Application Priority Data

Dec. 13, 2019 (EP) .................................... 19216062

(51) Int. Cl.
| | |
|---|---|
| *H04N 5/235* | (2006.01) |
| *H04N 5/225* | (2006.01) |
| *H04N 5/265* | (2006.01) |
| *H04N 5/378* | (2011.01) |
| *H04N 5/355* | (2011.01) |
| *G06T 5/50* | (2006.01) |
| *G06T 7/00* | (2017.01) |

(52) U.S. Cl.
CPC ......... *H04N 5/2355* (2013.01); *H04N 5/2258* (2013.01); *H04N 5/2353* (2013.01); *H04N 5/265* (2013.01)

(58) Field of Classification Search
CPC .. H04N 5/2355; H04N 5/2353; H04N 5/2258; H04N 5/265; H04N 5/3532; H04N 5/35581; H04N 5/378; G06T 5/50; G06T 7/00

USPC ...... 348/222.1, 239, 221.1, 362, 218.1, 367, 348/47, 296
See application file for complete search history.

(56) References Cited

U.S. PATENT DOCUMENTS

| | | |
|---|---|---|
| 8,803,990 B2 | 8/2014 | Smith |
| 8,908,064 B2 | 12/2014 | Koshiba |
| 9,113,097 B2 | 8/2015 | Yanai |
| 10,979,612 B2 * | 4/2021 | Usui .................... H04N 5/2258 |

(Continued)

FOREIGN PATENT DOCUMENTS

KR 10-2019-0032818 A 3/2019

OTHER PUBLICATIONS

Extended European Search Report dated May 4, 2020 for the European Patent Application No. 19216062.0.

*Primary Examiner* — Marly S Camargo

(74) *Attorney, Agent, or Firm* — Volpe Koenig

(57) ABSTRACT

High dynamic range imaging includes first image data captured using a first image sensor and a first exposure time, using a rolling shutter such that different lines within the first image data are captured at different times. Two or more instances of second image data are captured using second image sensors and second exposure times that are shorter than the first exposure time. The second image data are captured using a rolling shutter, and overlap at least in part with the first image data. A line of the first image data has a corresponding line in each instance of second image data, and the corresponding instances of second image data are captured at different second capture times. For a line in the first image data, the corresponding line from the instance of second image data is selected to be merged with the line in the first image data.

15 Claims, 3 Drawing Sheets

(56) References Cited

U.S. PATENT DOCUMENTS

| | | | |
|---|---|---|---|
| 2009/0201383 A1* | 8/2009 | Slavin | H04N 5/228 |
| | | | 348/222.1 |
| 2014/0176750 A1 | 6/2014 | Pajak et al. | |
| 2015/0043811 A1 | 2/2015 | Prabhudesai et al. | |
| 2015/0195450 A1 | 7/2015 | Kim | |
| 2016/0037045 A1* | 2/2016 | Jannard | H04N 5/2355 |
| 2016/0255262 A1 | 9/2016 | Lee et al. | |
| 2017/0289482 A1* | 10/2017 | Sato | H04N 5/3765 |
| 2018/0198970 A1 | 7/2018 | Seshadrinathan et al. | |
| 2018/0367789 A1 | 12/2018 | Henningsson et al. | |
| 2019/0020802 A1* | 1/2019 | Krishnaprasad | H04N 5/23227 |
| 2020/0267296 A1* | 8/2020 | Usui | H04N 5/225 |

* cited by examiner

MULTI-SENSOR HIGH DYNAMIC RANGE IMAGING

BACKGROUND

The present invention relates to image sensors, and more specifically to imaging devices with arrays of image sensors that may be used to produce High Dynamic Range (HDR) images.

Image sensors are commonly used in electronic devices such as cellular telephones, cameras, and computers to capture images. In a typical arrangement, an electronic device is provided with a single image sensor and a single corresponding lens. In certain applications, such as when acquiring still or video images of a scene with a large range of light intensities, it may be desirable to capture HDR images. In HDR images, highlight and shadow detail can be retained that would otherwise be lost in a conventional image.

A common type of image sensor is a Complementary Metal Oxide Semiconductor (CMOS) image sensor. In a CMOS sensor, photoelectric conversion elements of pixels perform photoelectric conversion for accumulating charges according to incident light amounts, and output electrical signal corresponding to the accumulated charges.

A CMOS sensor typically has an electronic shutter function. The electronic shutter function starts exposure by resetting photoelectric conversion elements of pixels, and ends exposure by reading out charges accumulated on the photoelectric conversion elements. In this manner, since the start and end of exposure are controlled by only the function of the image sensor, an exposure time from a low-speed shutter to a high speed shutter can be accurately controlled.

HDR typically works by merging a short exposure and a long exposure of the same scene, making the CMOS sensor suitable for an HDR image capture setup. Sometimes, more than two exposures can be involved. Since multiple exposures are captured by the same sensor, the exposures are captured at different times, which causes temporal problems in terms of motion blur.

One way to address this problem involves placing two image sensors very close to each other (similar to the setup of stereo camera, although with much shorter distance between the sensors as no disparity is required). In such a setup, one sensor is configured for long exposure, and the other sensor is configured for short exposure. The long exposure image and the short exposure image are then merged to create an HDR image. The captures are synchronized in time so that the merge into an HDR image can work more smoothly.

A further problem is that CMOS sensors generally use a rolling shutter operation (sometimes often referred to as a "focal plane shutter" operation). With the rolling shutter operation, charges on pixels are reset by sequentially scanning a plurality of two dimensionally arranged pixels for each line. Then, after an elapse of a predetermined exposure time, the pixels are sequentially scanned for each pixel to read out accumulated charges and to output signals. This sequential scanning causes different rows of the sensor to be read out at different points in time. Because of this, when merging a row in the long exposure image with a corresponding row in the short exposure image, problems with motion blur will still occur due to the rows being read out at different points in time. For at least these reasons there is a need for better methods of creating HDR images.

SUMMARY

According to a first aspect, a method, in a computer system, for high dynamic range imaging, includes:

capturing first image data using a first image sensor and a first exposure time, wherein the first image data is captured using a rolling shutter such that different lines within the first image data are captured at different first capture times;

capturing two or more instances of second image data using one or more second image sensors and one or more second exposure times that are shorter than the first exposure time, wherein:

the two or more instances of second image data are captured using a rolling shutter such that different lines within each instance of second image data are captured at different second capture times, the two or more instances of second image data overlap at least in part with the first image data, a line of the first image data has a corresponding line in each instance of second image data, the corresponding lines in the different instances of second image data being captured at different second capture times; and for a line in the first image data, selecting the corresponding line from the instance of second image data whose second capture time is closest to the first capture time, to be merged with the line in the first image data to generate a high dynamic range image.

This provides a way of improving techniques for HDR imaging, in particular with respect to how long- and short exposure lines are merged when a rolling shutter is used, such that artefacts from HDR are reduced and an improved HDR image is obtained.

According to one embodiment the second exposure times are different for different instances of second image data. That is, certain short exposures may be very short and others may be slightly longer, which offers flexibility in terms of which lines to merge into the HDR image from the short and long exposures.

According to one embodiment, the two or more instances of second image data are captured using two or more second image sensors, wherein at least one of the second exposure time and the second capture time differ between the two or more second image sensors. Having a setup with multiple short exposure sensors can allow for the two sensors, for example, to record images where the exposure time differs between the sensors, or where different sensors record different wavelengths in the electromagnetic spectrum. This can provide even further flexibility in selecting which lines to merge into the HDR image.

According to one embodiment, instances of second image data captured by the two or more image sensors overlap at least in part. That is, the capturing of short exposure images can be configured so that there is no "gap" between the capture of short exposure images. This makes it possible to further reduce the time difference between how lines are captured and read out when merging the long and short exposure images.

According to one embodiment, the first and second capture times, are determined with respect to one or more of: a reset of a line and a read of a line This allows flexibility in how the "reference point" is selected when determining which lines to merge. Sometimes it may be useful to have the reset of a line as the reference point. Other times, it may be useful to have the read of a line as the reference point, and other times, any specific point in between the read and reset can be used. Again, this provides the flexibility to select the "best" line from each exposure to be combined into an HDR image and to reduce image artifacts.

According to one embodiment, the first image sensor and the one or more second image sensors have different line times. The different line times may be beneficial in that the sensors can be read out with different speeds. That is, more short exposures can easily be fitted within a long exposure.

According to one embodiment, two corresponding lines may be selected from the two instances of second image data whose second capture times are closest to the first capture time, to be merged with the line in the first image data when generating a high dynamic range image. That is, the selection can involve the corresponding line from each of two or more short exposures. There may be circumstances under which the closest short exposure is not necessarily the best one for HDR purposes. In such scenarios, a corresponding line from a different short exposure images can also be selected to compensate for this drawback and be used together with the closest short image exposure.

According to one embodiment, a weight can be assigned to each selected line among the selected two corresponding lines, to be used in the generation of the high dynamic range image. That is, it is possible to select, for example, that the corresponding line from the closest short exposure is more "important" and should be assigned more weight than a corresponding line from a short exposure that is further away in time.

According to one embodiment, at least one of: the first exposure times, the first capture times, the second exposure times, and the second capture times are selected in response to a user input. That is, a user may configure exposure times and capture times for the different sensors to the particular situation at hand such that the best possible HDR image can be generated.

According to one embodiment, the selecting of a corresponding line from the instance of second image data can be done for each line in the first image data. Making such a selection for each line in the first image data ensures that the best selection of lines is made for the entire image, and thus provides an HDR image having high quality throughout the entire image.

According to one embodiment, input can be received regarding a region of interest in the first image data, wherein, for each line in the first image data intersecting the region of interest, a corresponding line from a same instance of second image data is selected. That is, while the basic rule is to select a line which is captured closest in time, this rule does not need to be applied to every line in the image. Specifically, a user may be interested in specifying a region within an image where there should not be any discontinuities, as could be the case when lines from different instances of second image data are used. Therefore, for such regions, it may be better to select a line from the same instance of second image data. The proper instance of second image data for a line in the first image data that overlaps the specified region can be identified using the basic rule of temporal proximity as described above. Then, for the other lines in the first image data that also overlap the specified region, the corresponding line can be selected from that same instance of second image data, even if there happens to be another instance of second image data that has a capture time closer to the first capture time. Using this method may avoid or at least significantly reduce the discontinuities in the resulting HDR image.

According to a second aspect, a system for high dynamic range imaging includes a memory and a processor. The memory contains instructions that when executed by the processor causes the processor to perform a method that includes:

capturing first image data using a first image sensor and a first exposure time, wherein the first image data is captured using a rolling shutter such that different lines within the first image data are captured at different first capture times;

capturing two or more instances of second image data using one or more second image sensors and one or more second exposure times that are shorter than the first exposure time, wherein:
the two or more instances of second image data are captured using a rolling shutter such that different lines within each instance of second image data are captured at different second capture times,
the two or more instances of second image data overlap at least in part with the first image data,
a line of the first image data has a corresponding line in each instance of second image data, the corresponding lines in the different instances of second image data being captured at different second capture times; and for a line in the first image data, selecting the corresponding line from the instance of second image data whose second capture time is closest to the first capture time, to be merged with the line in the first image data to generate a high dynamic range image.

The system advantages correspond to those of the method and may be varied similarly.

According to a third aspect, a thermal camera includes a system as described above, for high dynamic range imaging. The advantages of the camera correspond to those of the system and may be varied similarly.

According to a fourth aspect, a computer program for high dynamic range imaging contains instructions corresponding to the steps of:

capturing first image data using a first image sensor and a first exposure time, wherein the first image data is captured using a rolling shutter such that different lines within the first image data are captured at different first capture times;

capturing two or more instances of second image data using one or more second image sensors and one or more second exposure times that are shorter than the first exposure time, wherein:
the two or more instances of second image data are captured using a rolling shutter such that different lines within each instance of second image data are captured at different second capture times,
the two or more instances of second image data overlap at least in part with the first image data,
a line of the first image data has a corresponding line in each instance of second image data, the corresponding lines in the different instances of second image data being captured at different second capture times; and for a line in the first image data, selecting the corresponding line from the instance of second image data whose second capture time is closest to the first capture time, to be merged with the line in the first image data to generate a high dynamic range image.

The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

As was described above, it would be beneficial to provide improved techniques for HDR imaging, in particular with respect to how long and short exposure lines are merged when a rolling shutter is used, such that motion blur and other artefacts are reduced. At a general level, the various embodiments work as follows.

Rather than using a single image sensor to capture long exposure and short exposures images, respectively, two or more sensors are placed in close proximity. One of the sensors is used to capture a long exposure image, and one or more of the other sensors is used to capture several short exposure images that at least in part overlap with the exposure time of the long exposure image. The sensors use a rolling shutter. Each line in the sensor having the long exposure image has a spatially corresponding row in each of the sensors having a short exposure image.

When the images have been captured, lines are selected from the long and short exposure images for merging into an HDR image. In particular, for each long exposure line, a corresponding line is selected from the short exposure in which the line has the closest capture time with respect to the capture time of the long exposure line. In some implementations more than one corresponding line can be selected from different short exposure images, as will be described in further detail below. This selection of lines produces fewer motion artefacts compared to conventional techniques. The selected lines are sent to an HDR image generator that generates the HDR image, using conventional techniques that are well known to those having ordinary skill in the art.

Figure 1A:
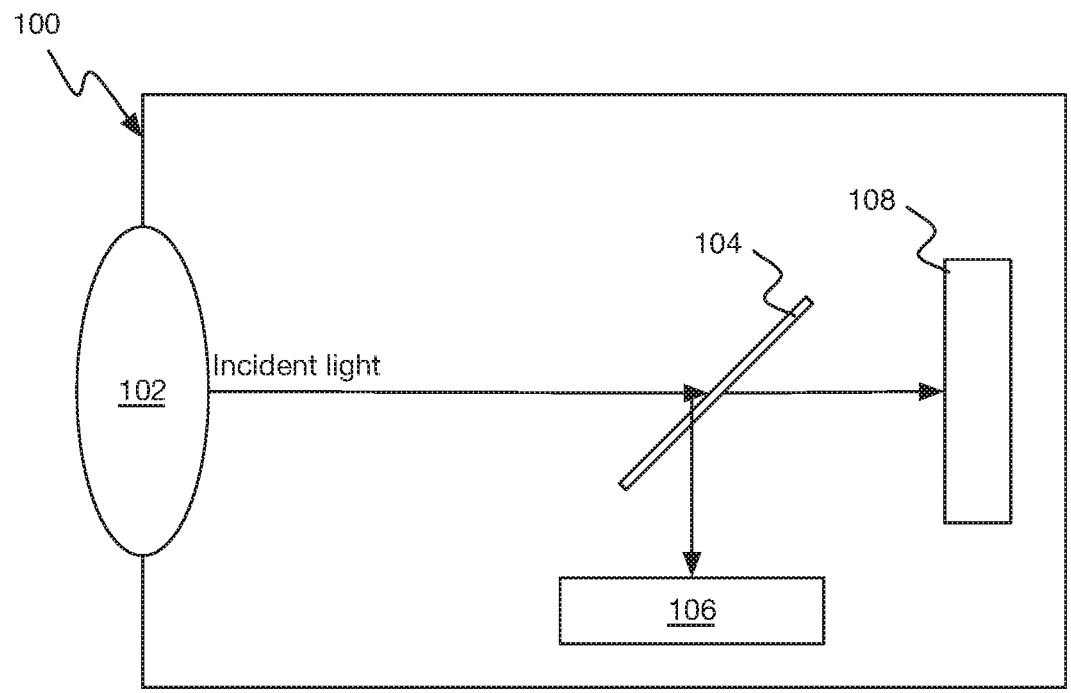
FIGS. 1A and 1B are schematic diagrams showing a camera 100 in which the system and methods in accordance with various embodiments can be implemented.
Figure 1B:
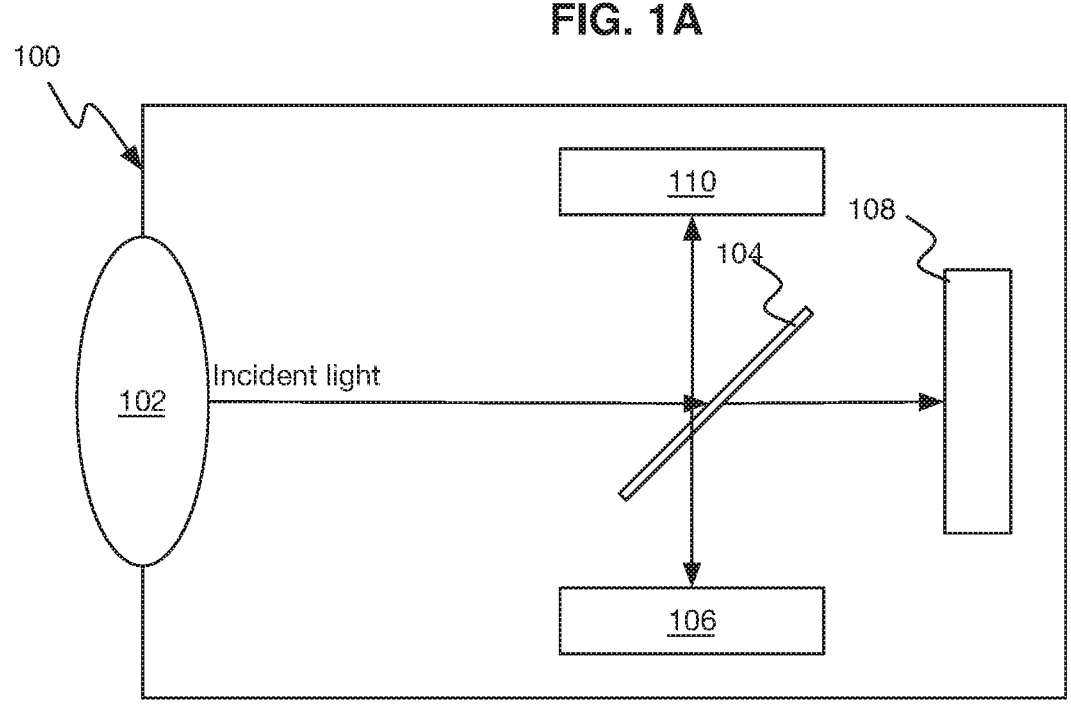

Various embodiments will now be described in further detail and by way of example with reference to the drawings. FIGS. 1A and 1B show schematic views of a camera 100 in which various embodiments can be implemented. As can be seen in FIGS. 1A and 1B, the camera has a lens 102 through which incident light passes and reaches a semi-transparent mirror 104. The mirror 104 acts as a beam splitter and divides the incident light up into components, which each reaches a sensor.

In FIG. 1A, there are two sensors, 106 and 108, respectively. In FIG. 1B, there are three sensors, 106, 108 and 110, respectively. Each of these sensors record the same image. The sensors shown in FIGS. 1A and 1B are conventional CMOS sensors that use a rolling shutter operation as described above.

It should be noted that the mirror 104 does not necessarily have to be a mirror, but can be any optical component that has the ability of dividing incident light into multiple components, such as a prism, for example. It should also be noted that as an alternative to using a beam splitter (i.e., mirror, prism, etc.), the two image sensors may alternatively be arranged side-by-side at a close distance to each other, similar to the setup of stereo camera, although with much shorter distance between the sensors as no disparity is required. It should further be noted that while only two and three sensors are shown in FIGS. 1A and 1B, respectively, this is done for illustration purposes only, and there may also be implementations that use a larger number of sensors.

Preferably, the sensors 106, 108, 110, have similar properties in terms of resolution, pixel characteristics, etc., in order to reduce artefacts when combining images from two or more of the sensors. However, this is not a requirement, and there may be situations in which some other beneficial properties of the sensors 106, 108 and 110 may outweigh the drawbacks of possible image and motion artefacts. Such design choices fall well within the capabilities of a person having ordinary skill in the art.

Figure 2:
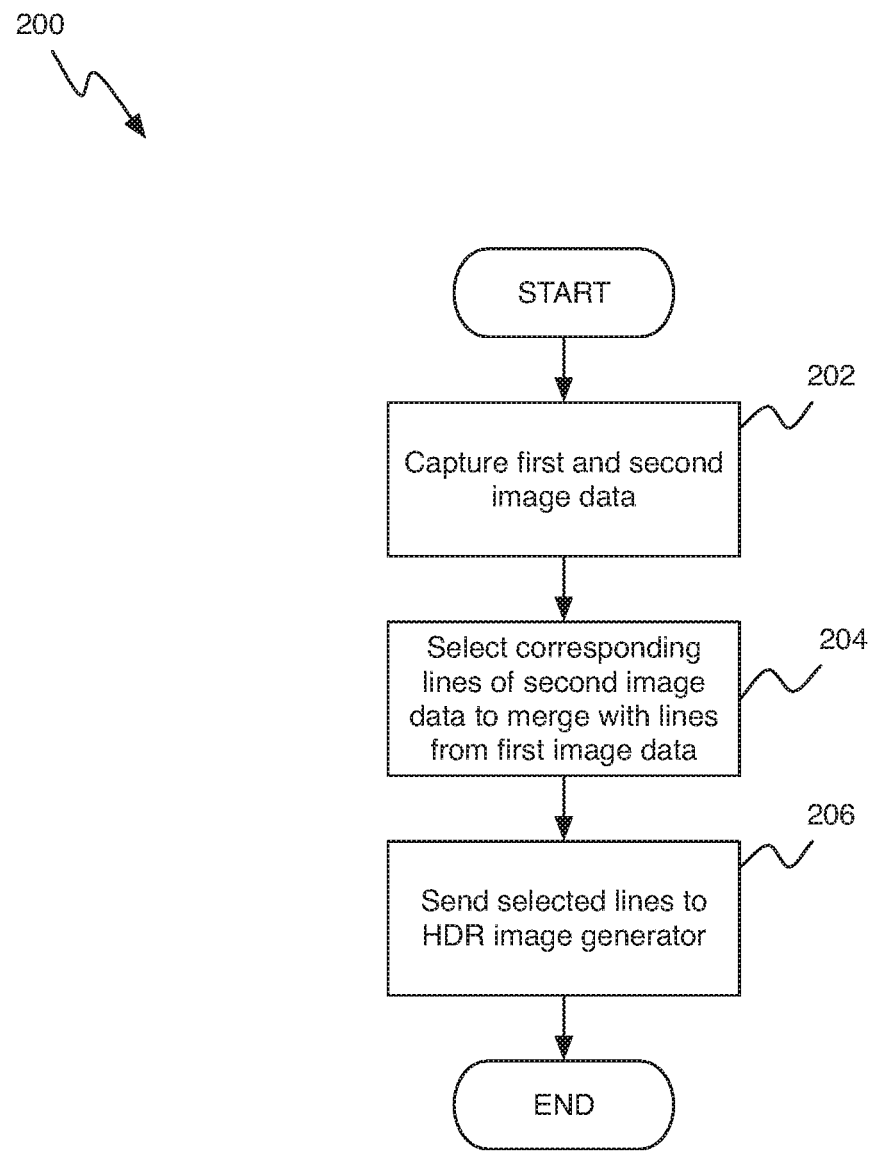
FIG. 2 is a flowchart depicting a method selecting image data to be merged into an HDR image, in accordance with one embodiment.

FIG. 2 is a flowchart showing a method 200 for selecting lines to be used in HDR imaging, in accordance with one embodiment. As can be seen in FIG. 2, the method 200 starts by capturing first image data and second image data, step 202, with sensors 106 and 108, respectively, as illustrated in FIG. 1A. Typically, sensor 106 has a long exposure time and sensor 108 has a short exposure time, such that multiple images are captured by sensor 108 while sensor 106 captures a single image. It should be noted that there does not need to be an exact overlap between when the long and short exposures, respectively, start. It is typically sufficient that there are two or more shorter exposures within one long exposure, and the exact placement in time for these shorter exposures may vary.

Figure 3:
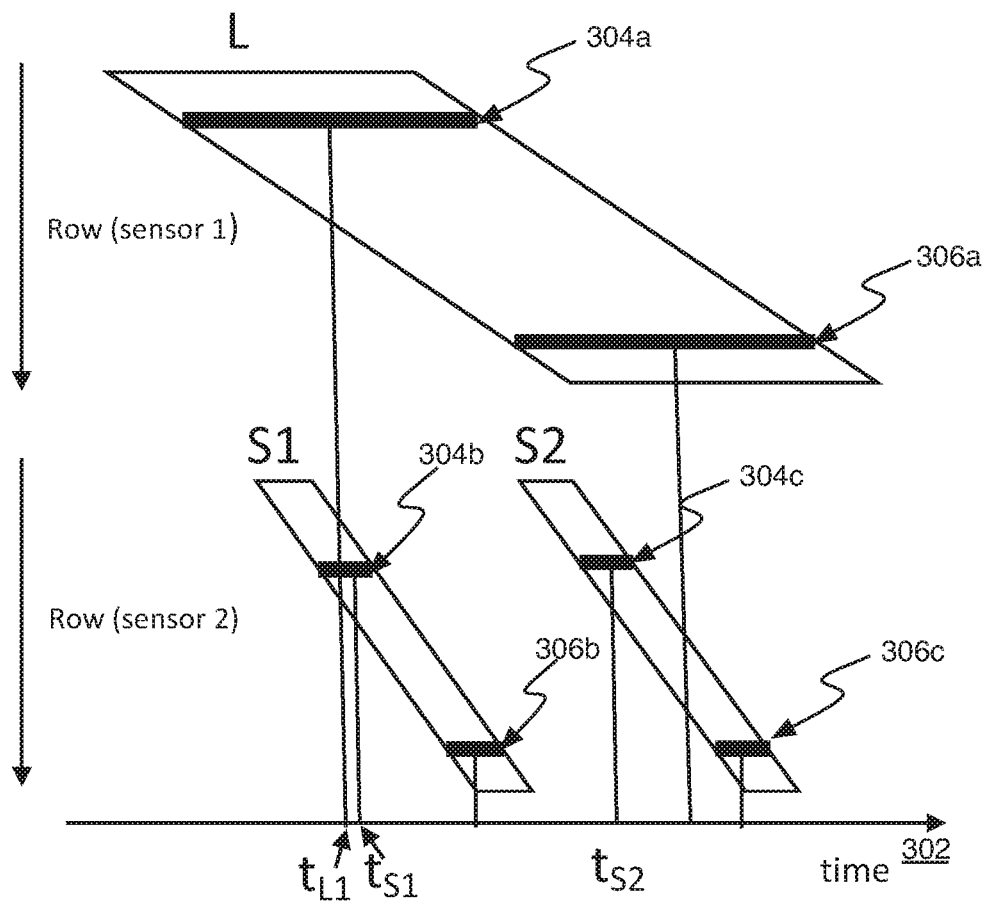
FIG. 3 is a schematic diagram showing the relation between a long exposure image and short exposure images captured over time, in accordance with one embodiment.

FIG. 3 provides a conceptual illustration 300 of how the two sensors 106 and 108 capture short exposure and long exposure images, respectively, of the same scene. At the bottom of FIG. 3 is a timeline 302. At the top is a representation of the long exposure, L, captured by sensor 106 and below that are representations of two short exposures S1 and S2, respectively, captured by sensor 108. As can be seen in FIG. 3, the short exposures S1 and S2 are captured during the capture of the long exposure L. However, it should be noted that the capture of S1 and S2 does not need to be contained within the capturing time of L. There may be situations when the capture of S1 starts before the capture of L starts, for example, and there may be situations when the capture of S2 finishes after the capture of L finishes.

When a rolling shutter is used, different rows of a sensor are read out at different points in time. This is illustrated by horizontal lines 304a-c and 306a-c in FIG. 3. For example, for the long exposure L, row 304a is read before row 306b. The corresponding situation applies to rows 304b and 306b of exposure S1 and rows 304c and 306c of exposure S2. FIG. 3 also illustrates how sensor 108 has a shorter readout time compared to sensor 106, by having a steeper "slope."

It can also be seen in FIG. 3 how a row in the long exposure L has a corresponding row in each of the short exposures S1 and S2, respectively. In particular, in the example illustrated in FIG. 3, row 304a in the long exposure L has corresponding rows 304b in short exposure S1 and 304c in short exposure S2. Row 306a in the long exposure L has corresponding rows 306b in short exposure S1 and 306c in short exposure S2.

When the HDR image is generated, a row in the long exposure L is merged with a spatially corresponding row from one of the short exposures S1, S2. Returning now to FIG. 2, the method continues to select, for each line in the long exposure L, one or more corresponding lines from one or more of the short exposures S1 and S2 to be merged with the line in the long exposure L, step 204. This selection should be done in a way that mitigates the negative effects of using a rolling shutter to the largest extent possible, for example to eliminate problems with HDR merge motion artefacts due to the rows being read out at different points in time.

In one implementation, this is addressed by selecting the corresponding row from the short exposure S1, S2, that is exposed closest in time to the row of the long exposure L. To measure this "closeness in time," a capture time may be assigned to each row, for example, the capture time may be the point in time that is located half way between a reset and a read of the row. For example, in FIG. 3, time tL1 represents the half way time point for line 304a of the long exposure L and would thus be designated the capture time for line 304a. Correspondingly, time tS1 represents the half way time point for line 304b of the short exposure S1, and time tS2 represents the half way time point for line 304c of the short exposure S2. Thus, tS1 and tS2 would be the capture times for lines 304b and 304c, respectively. However, as the skilled person realizes this half way time point is merely one choice and other alternative capture times may also be considered, such as letting the capture time equal the read-out time or any other time point between a reset and a read of a line. Such design choices can easily be made by those having ordinary skill in the art.

As can be seen in FIG. 3, for the long exposure line 304a with capture time tL1, the closest corresponding line in S1 and S2, is line 304b in short exposure S1, with capture time tS1. Thus, for purposes of performing HDR, line 304a in the long exposure L would be selected to be merged with the corresponding line 304b in the first short exposure S1. On the other hand, line 306a in the long exposure L would instead be selected to be merged with the corresponding line 306c of the second short exposure S2. Ultimately, this means that different rows of pixels can be fetched from different instances of short exposures to compensate for the rolling shutter effect when composing the HDR image.

Returning to FIG. 2 again, the selected rows from the different exposures are sent to an HDR image generator, which generates an HDR image using techniques that are well known to those having ordinary skill in the art, step 204. This ends method 200.

It should be noted that in the above example, the line time (that is, the time between the reset of two consecutive rows on a sensor) is different for the long exposure sensor 106 and the short exposure sensor 108. Specifically, the line time for the long exposure sensor 106 is longer than that of the short exposure sensor 108. Having sensors with such properties is expected to improve the results and yield better time synchronized matches between rows of the long and the short exposures. However, it should be noted that it is not a requisite for the embodiments to work. There are still benefits of using this setup, even when the line times are identical for all sensors, as the sensors capture the exact, or at the very least nearly the exact, same scene and the images from the sensors are closer in time (compared to the conventional case when a single sensor is used to alternate short and long exposures).

Further, in some implementations, to reduce discontinuities due to choosing different short exposures for different rows, the short exposures may be blended. Typically, when blending occurs, lines can be assigned different weights. For example, the line that is closest in time, and that would normally be chosen as described above, can be assigned a weight that is higher than a corresponding line from a different short exposure that is further away in time. For example, with reference again to FIG. 2, instead of selecting line 304b to be merged with line 304a, as is done in a typical embodiment, it may prove useful to select not only line 304b but also line 304c to be merged with line 304a in order to reduce discontinuities in the resulting HDR image. However, as line 304c is located further away in time compared to line 304b with respect to line 304a, line 304c is given less weight. For example, a blended line can be created that where each pixel value is a combination of 80% of the pixel value in line 304b, and 20% of the pixel value in line 304c. This blended line can then be sent to the HDR image generator along with the long exposure line 304a. Many variations can be envisioned by the skilled artisan.

It should also be noted that while the example above refers to a setup using two sensors, such as the one shown in FIG. 1A, there may be even more advantages with using more sensors, such as the setup shown in FIG. 1B. In that configuration, sensors 108 and 110 can both be short exposure sensors, and can be timed such that the exposures of sensor 108 occur in between the exposures of sensor 110, or that the short exposures from sensors 108 and 110 even overlap in part. This provides a larger number of lines from which a "best match" can be selected (or a larger number of lines that can be weighed and blended in various configurations). Exactly how to do this will depend on the particular situation at hand and is considered a matter of design choice that can be determined by a person having ordinary skill in the art.

In some implementations, one of the sensors, such as sensor 110, for example, could have a different exposure time compared to sensors 106 and 108. For example, there may be a short exposure sensor 108, a medium exposure sensor 110, and a long exposure sensor 106. This can yield additional benefits, such as allowing capture of the image with better quality throughout a wider range of luminance levels, as compared to what would be possible when merging only a long and a short exposure.

As will be appreciated by one skilled in the art, aspects may be embodied as a system, method or computer program product. Accordingly, some aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, other aspects may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments set forth herein. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the techniques described herein are not dependent on whether color sensors or black and white sensors are used, and may also be applied to Infrared (IR) light. There may also be embodiments where the different sensors are placed in different cameras that capture the same scene, rather than having all the sensors within a single camera. However, such a setup may require more physical space for the cameras, and also require more complexity with respect to controlling the cameras. Thus, while such a setup is fully technically possible, it may be less feasible due to space and cost requirements. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for high dynamic range imaging, comprising:
capturing first image data using a first image sensor and a first exposure time, wherein the first image data is captured using a rolling shutter such that different lines within the first image data are captured at different first capture times;
capturing two or more instances of second image data using one or more second image sensors and one or more second exposure times that are shorter than the first exposure time, wherein:
the two or more instances of second image data are captured using a rolling shutter such that different lines within each instance of second image data are captured at different second capture times,
the two or more instances of second image data overlap at least in part with the first image data,
a line of the first image data has a spatially corresponding line in each instance of second image data, the spatially corresponding lines in the different instances of second image data being captured at different second capture times; and
for a line in the first image data, selecting the spatially corresponding line from the instance of second image data whose second capture time is closest to the first capture time, to be merged with the line in the first image data to generate a high dynamic range image.

2. The method of claim 1, wherein the second exposure times are different for different instances of second image data.

3. The method of claim 1, wherein the two or more instances of second image data is captured using two or more second image sensors, wherein at least one of the second exposure time and the second capture time differ between the two or more second image sensors.

4. The method of claim 3, wherein instances of second image data captured by the two or more image sensors overlap at least in part.

5. The method of claim 1, wherein the first and second capture times are determined with respect to one or more of: a reset of a line and a read of a line.

6. The method of claim 1, wherein the first image sensor and the one or more second image sensors have different line times.

7. The method of claim 3, wherein the second image sensors have different line times.

8. The method of claim 1, wherein selecting comprises:
for a line in the first image data, selecting the two spatially corresponding lines from the two instances of second image data whose second capture times are closest to the first capture time, wherein both selected lines are to be merged with the line in the first image data when generating a high dynamic range image.

9. The method of claim 8, further comprising:
assigning a weight to each selected line among the selected two spatially corresponding lines, to be used in the generation of the high dynamic range image.

10. The method of claim 1, wherein at least one of: the first exposure times, the first capture times, the second exposure times, and the second capture times are selected in response to a user input.

11. The method of claim 1, further comprising:
for each line in the first image data, selecting the spatially corresponding line from the instance of second image data whose second capture time is closest to the first capture time, to be merged with the line in the first image data to generate a high dynamic range image.

12. The method of claim 1, further comprising:
receiving input regarding a region of interest in the first image data, wherein, for each line in the first image data intersecting the region of interest, a spatially corresponding line from a same instance of second image data is selected.

13. A system for high dynamic range imaging, comprising:
a memory; and
a processor,
wherein the memory contains instructions that when executed by the processor causes the processor to perform a method that includes:
capturing first image data using a first image sensor and a first exposure time, wherein the first image data is captured using a rolling shutter such that different lines within the first image data are captured at different first capture times;
capturing two or more instances of second image data using one or more second image sensors and one or more second exposure times that are shorter than the first exposure time, wherein:
the two or more instances of second image data are captured using a rolling shutter such that different lines within each instance of second image data are captured at different second capture times,
the two or more instances of second image data overlap at least in part with the first image data,
a line of the first image data has a spatially corresponding line in each instance of second image data, the spatially corresponding lines in the different instances of second image data being captured at different second capture times; and
for a line in the first image data, selecting the spatially corresponding line from the instance of second image data whose second capture time is closest to the first capture time, to be merged with the line in the first image data to generate a high dynamic range image.

14. A camera including a system for high dynamic range imaging, comprising:
a memory; and
a processor,
wherein the memory contains instructions that when executed by the processor causes the processor to perform a method that includes:
capturing first image data using a first image sensor and a first exposure time, wherein the first image data is captured using a rolling shutter such that different lines within the first image data are captured at different first capture times;
capturing two or more instances of second image data using one or more second image sensors and one or more second exposure times that are shorter than the first exposure time, wherein:
the two or more instances of second image data are captured using a rolling shutter such that different lines within each instance of second image data are captured at different second capture times,
the two or more instances of second image data overlap at least in part with the first image data,
a line of the first image data has a spatially corresponding line in each instance of second image data, the spatially corresponding lines in the different instances of second image data being captured at different second capture times; and
for a line in the first image data, selecting the spatially corresponding line from the instance of second image data whose second capture time is closest to the first capture time, to be merged with the line in the first image data to generate a high dynamic range image.

15. A non-transitory computer readable storage medium having program instructions embodied therewith, the program instructions being executable by a processor to perform a method comprising:
capturing first image data using a first image sensor and a first exposure time, wherein the first image data is captured using a rolling shutter such that different lines within the first image data are captured at different first capture times;
capturing two or more instances of second image data using one or more second image sensors and one or more second exposure times that are shorter than the first exposure time, wherein:
the two or more instances of second image data are captured using a rolling shutter such that different lines within each instance of second image data are captured at different second capture times,
the two or more instances of second image data overlap at least in part with the first image data,
a line of the first image data has a spatially corresponding line in each instance of second image data, the spatially corresponding lines in the different instances of second image data being captured at different second capture times; and for a line in the first image data, selecting the spatially corresponding line from the instance of second image data whose second capture time is closest to the first capture time, to be merged with the line in the first image data to generate a high dynamic range image.

* * * * *